(12) United States Patent
Leizerson et al.

(10) Patent No.: US 7,177,030 B2
(45) Date of Patent: Feb. 13, 2007

(54) DETERMINATION OF THIN FILM TOPOGRAPHY

(75) Inventors: Ilya Leizerson, Technion Halfa (IL); Stephen G. Lipson, Halfa (IL)

(73) Assignee: Technion Research and Development Foundation Ltd., Haifa (IL)

( * ) Notice: Subject to any disclaimer, the term of this patent is extended or adjusted under 35 U.S.C. 154(b) by 239 days.

(21) Appl. No.: 10/829,880

(22) Filed: Apr. 22, 2004

(65) Prior Publication Data

US 2005/0237537 A1    Oct. 27, 2005

(51) Int. Cl.
*G01B 11/02*    (2006.01)

(52) U.S. Cl. ..................................... 356/504

(58) Field of Classification Search ............... 356/492, 356/493, 495, 496, 497, 503, 504, 511, 512
See application file for complete search history.

(56) References Cited

U.S. PATENT DOCUMENTS

| | | | |
|---|---|---|---|
| 5,133,601 A | | 7/1992 | Cohen et al. |
| 5,202,745 A | * | 4/1993 | Sorin et al. ................. 356/73.1 |
| 5,371,596 A | * | 12/1994 | Hattori et al. ............... 356/497 |
| 5,440,238 A | | 8/1995 | Martens et al. |
| 5,729,343 A | | 3/1998 | Aiyer |
| 5,748,296 A | | 5/1998 | Canteloup |
| 5,999,262 A | | 12/1999 | Dobschal et al. |
| 6,182,512 B1 | | 2/2001 | Lorraine |
| 6,261,152 B1 | * | 7/2001 | Aiyer ............................. 451/6 |
| 6,327,037 B1 | * | 12/2001 | Chou et al. ................. 356/484 |
| 6,545,763 B1 | | 4/2003 | Kim |
| 6,645,045 B2 | * | 11/2003 | Ohkawa ....................... 451/6 |
| 2002/0085544 A1 | * | 7/2002 | Luddy ......................... 370/358 |

OTHER PUBLICATIONS

I. Leizerson et al. "Three-Beam Interference Method For Measuring Very Thin Films" Appl. Phy. Let., 2003, 82 (2), pp. 260-263.

* cited by examiner

*Primary Examiner*—Gregory J. Toatley, Jr.
*Assistant Examiner*—Michael A. Lyons
(74) *Attorney, Agent, or Firm*—Wolf, Block, Schorr & Solis-Cohen LLP; William H. Dippert

(57) ABSTRACT

A method and device for determining the topography of a thin film having a front surface and a back surface. The method comprises: irradiating the film with an incident coherent or partially coherent light beam so as to get two reflected beams, the first reflected beam being reflected from the front surface of the film, and the second beam being reflected from the back surface of the film; creating an interferometric image from a united beam comprising the two reflected beams and a reference beam, the reference beam originating from the incident beam, and made to be substantially parallel to the two reflected beams. The reference beam acquires a phase shift. The interferometric image is created the interference between a combined beam comprising the reference beam and the second reflected beam, and the first reflected beam, thus acquiring information on the topography of the film, that cannot be acquired using the two reflected beams alone.

19 Claims, 10 Drawing Sheets

Figure 4a
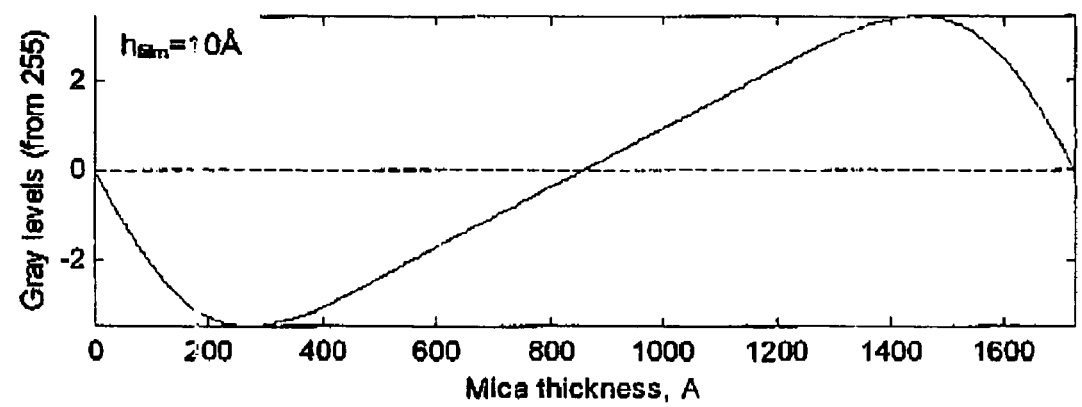
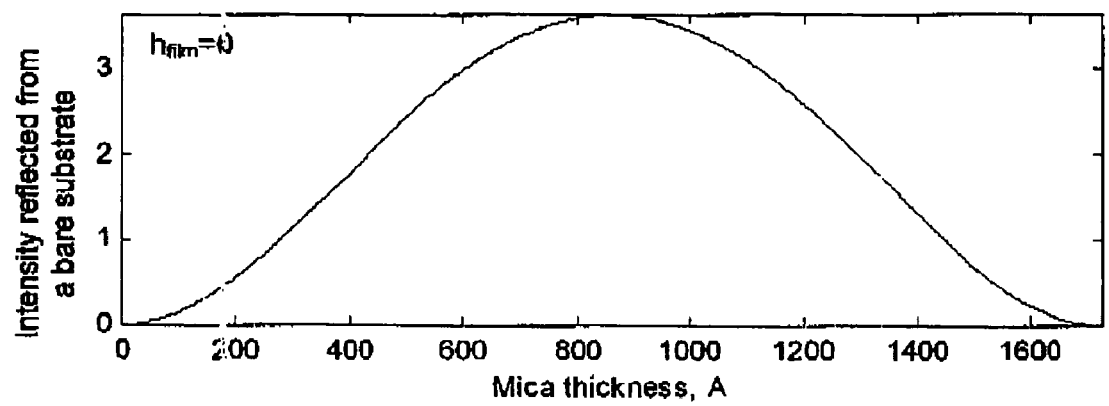
Figure 4b

Figure 6a
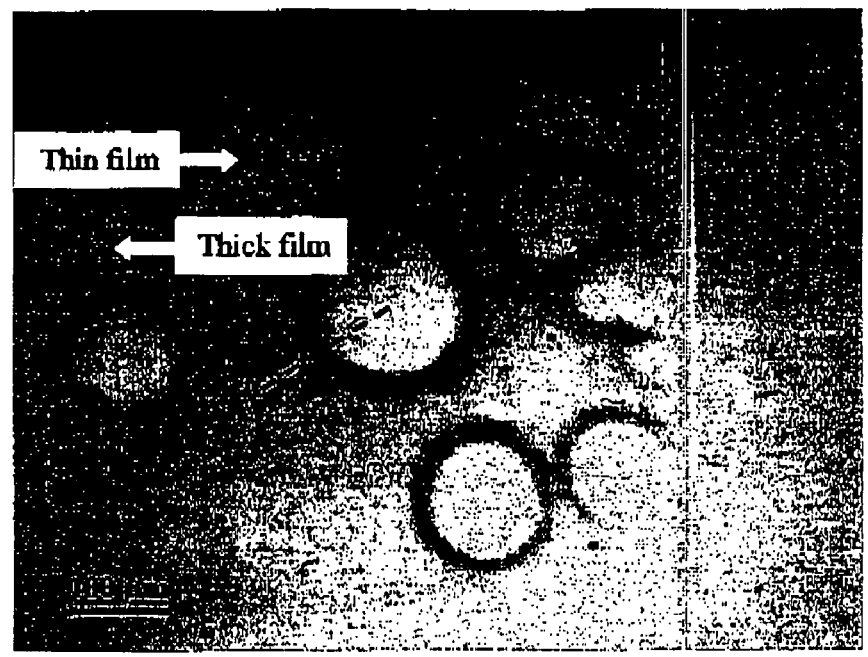
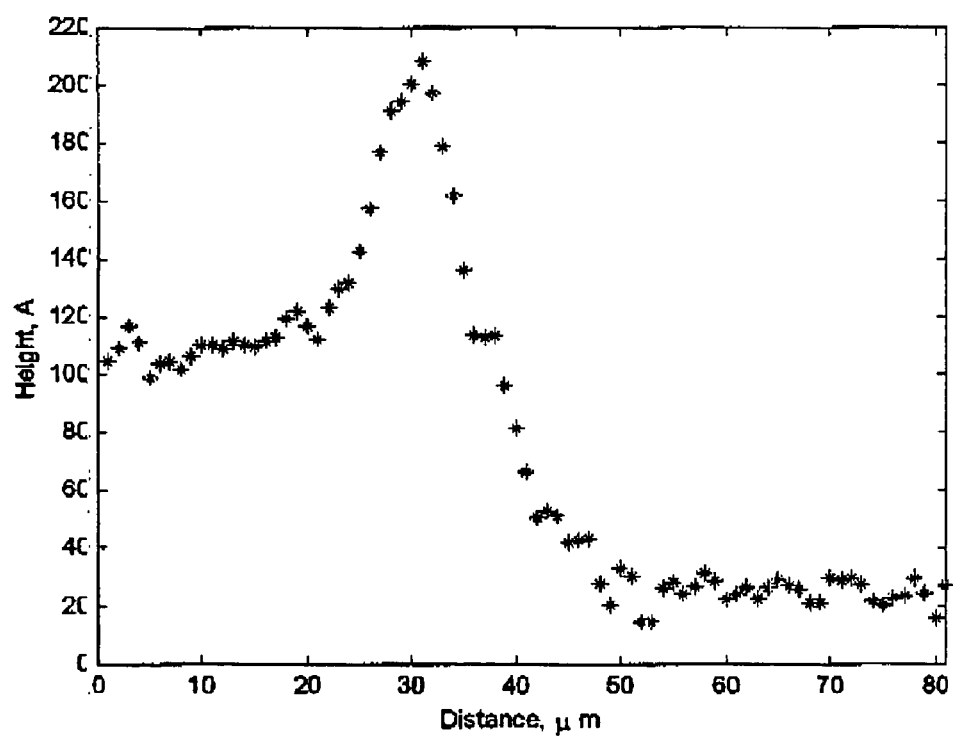
Figure 6b

DETERMINATION OF THIN FILM TOPOGRAPHY

FIELD OF THE INVENTION

The present invention relates to determining the topography of thin films.

BACKGROUND OF THE INVENTION

The non-destructive nature of optical methods makes them very important tools in investigating thin films. Several interferometric and ellipsometric tools are widely used for thin film thickness measurement in industry and basic science (on ellipsometry see, for example: M. Steinberg et al, A New Method for Measurement on Surfaces and Surface Layers, Mater. Sci. and Eng., 1980, 42, 65–69. D. Beaglehole, H. K. Christenson, "Vapour adsorption on mica and silicon-entropy effects, layering and surface forces", J.Phys.Chem., 96, 3395–3403, (1992). D. Beaglehole, "Performance of a microscopic imaging ellipsometer", Rev.Sci-.Instrum., 59, 2557, (1998)). The typical thickness of films in microelectronics varies in the range of 0÷10 μm. The development of faster microelectronic devices demands development of very thin film technology and therefore new characterization methods of thin films are needed. Recent investigations of thin film stability involve understanding the influence of entropy effects on molecular scales. In the field of biotechnology, self-assembling monolayers and multilayers are becoming increasingly important as technological tools in production of mono-molecular devices. These encourage a development of new techniques for thin film measurement.

U.S. Pat. No. 6,545,763 (Kim et al.) discloses a method and a recording medium for measuring three-dimensional thickness profile and refractive index of a transparent dielectric thin-film with or without a pattern, which is fabricated in the semiconductor or related industrial field. A method for measuring a thickness profile using white-light scanning interferometry in an optical system includes the following steps. A first step extracts a phase graph by acquiring an interference signal and performing Fourier transform. A second step is to extract a mathematical phase graph through modeling of a measurement object. And a third step is to measuring a profile value and a thickness value by applying an optimization technique to an error function determined by using phase values which is acquired from said first step and said second step.

In U.S. Pat. No. 5,748,296 (Canteloup) is described an illumination beam that is sent onto a localized region of the surface layer of a thin-film structure which is being etched in a vacuum processing chamber. The reflected light beam is sent through a filter to the matrix sensor of a video camera, and to an optical disperser or an interference filter, a selection diaphragm, a fiber-optic cable, and an analysis slit at the input of the optical disperser or interference filter. A spectral analysis of the reflected light beam is performed to determine the layer structure of a localized region.

U.S. Pat. No. 5,729,343 (Aiyer) disclosed a film measurement apparatus having a stage with a support surface on which a substrate coated with a film may rest. An extended light source faces the stage, and an imager is aimed at the stage to capture the reflection of the light source. The imager includes a receiver upon which an image of an extended portion of the substrate may be generated, and a processor in communication with the imager is operated to calculate the thickness of the film at a plurality of locations. The stage may be tilted to empirically measure an average illumination and the contrast between interference fringes, avoiding theoretical estimates provided by Fresnel's equation.

U.S. Pat. No. 6,182,512 (Lorraine) described imaging apparatus, which includes a wave generator for generating a wave in an article; a detector for detecting a wave in the article; and a processor which carries out several functions. It forms a matched filter based on a response of the article to a wave propagated through the article; it directs the wave generator to generate a wave at a plurality of generation positions; it directs the detector to detect a motion of the article at a plurality of detection positions; forms a scan data set from the detected motion of the article; it multiplies the scan data set by the matched filter to produce a compensated data set; and coherently sums data points in the compensated data set to produce a focused image.

In U.S. Pat. No. 5,999,262 (Dobschal et al.) a process and a device are described for detecting physical, chemical, biological or biochemical reactions and interactions on biochemically or chemically functionalized specimen carriers in the form of layers or films from the spectral reflection after irradiation of the specimens with light of different wavelengths. According to the process, the specimens are arranged on a substrate plate with a carrier layer of a carrier plate and are irradiated with light. The following process steps are carried out: a) temporally resolved illumination of a local arrangement of specimens to be analyzed by light of different wavelengths from a tunable light source which is arranged subsequent to a polychromatic light source; b) the imaging of the beam component reflected from at least one boundary surface of each specimen or of the beam components or interferences reflected and interfered, respectively, at boundary surfaces of each specimen which are arranged one behind the other in the direction of light, this imaging being carried out on a spatially resolving areal detector array or a video camera by means of subsequently arranged optical elements; and c) a wavelength-selective detection of the radiation intensities reflected and influenced by the specimens or of the intensities of the imaged interferences, determination of a wavelength spectrum associated with each specimen, and derivation of parameters characterizing the interactions and reactions to be analyzed.

U.S. Pat. No. 5,440,238 discloses apparatus and method for detecting, determining, and imaging surface resistance corrosion, thin film growth, and oxide formation on the surface of conductors or other electrical surface modification. The invention comprises a modified confocal resonator structure with the sample remote from the radiating mirror. Surface resistance is determined by analyzing and imaging reflected microwaves; imaging reveals anomalies due to surface impurities, non-stoichiometry, and the like, in the surface of the superconductor, conductor, dielectric, or semiconductor.

U.S. Pat. No. 5,133,601 describes an invention relates to an interferometric measuring device capable of profiling a surface with large height variations.

Briefly described, and in accordance with one embodiment thereof, the invention provides a method of profiling a rough surface of an object by producing an optical path difference so that initially a highest point of the rough surface is optically aligned with and outside of the focus range of a solid-state imaging array.

The contrast or modulation for each pixel is determined from the intensity data. That contrast or modulation is compared with a stored prior value of contrast or modulation of that pixel. The prior value is replaced with the most recently computed contrast or modulation if the most recently computed one is greater than the one previously stored. The corresponding relative height or optical path difference is also stored for that pixel. The optical path difference is either incrementally or linearly varied through a selected distance, and the foregoing procedure is repeated until maximum values of contrast are obtained and stored for each pixel.

The present invention aims at providing a new compact optical tool for measurement of atomically thin films, which can give a real time image thickness map with high spatial resolution. It also opens the possibility of working with transparent substrates commonly used in biology. Current thin film measurement methods do not possess such a universal appeal.

SUMMARY OF THE INVENTION

There is thus provided, in accordance with a preferred embodiment of the present invention, a method for determining the topography of a thin film having a front surface and a back surface, the method comprising:

irradiating the film with an incident coherent or partially coherent beam so as to get two reflected beams, the first reflected beam being reflected from the front surface of the film, and the second beam being reflected from the back surface of the film; and using a third reference beam with controlled phase shift $\phi$, originating from the incident beam, and substantially parallel to the two reflected beams, such that the reference beam and the beam reflected from the back surface of the film form a combined beam which, together with the reflection from the front surface of the film creates an interferometric image of the film, whereby $\phi$ is chosen so that the interference of the three said beams allows acquisition of information on the topography of thin films that cannot be acquired using the two reflected beams alone.

Furthermore, in accordance with a preferred embodiment of the present invention, the incident beam is partially coherent with coherence length that is at least equal to the maximum thickness of the film.

Furthermore, in accordance with a preferred embodiment of the present invention, at least two interferometric images are obtained, from which information on the topography of the film is extracted.

Furthermore, in accordance with a preferred embodiment of the present invention, at least two cameras are used in the acquiring of said at least two interferometric images.

Furthermore, in accordance with a preferred embodiment of the present invention, the third reference beam is reflected off a surface of the transparent substrate below the film.

Furthermore, in accordance with a preferred embodiment of the present invention, the optical thickness of the substrate at a predetermined angle of incidence is chosen so that the phase of the combined beam is substantially in quadrature with the phase of the beam reflected from the front surface of the film.

Furthermore, in accordance with a preferred embodiment of the present invention, the third reference beam is reflected off a mirror.

Furthermore, in accordance with a preferred embodiment of the present invention, the phase of the third reference beam $\phi$ is optimized by means of a phase shift device so that the intensity of the resultant of all the aforesaid three beams is most sensitive to changes in the thickness of the sample, which in the particular case of a very thin sample means that the phase of the third reference beam is substantially in quadrature with the phase of the sum of the beams reflected from the front surface of the sample and the back surface of the sample.

Furthermore, in accordance with a preferred embodiment of the present invention, the phase shift is acquired using a transparent wave-plate.

Furthermore, in accordance with a preferred embodiment of the present invention, the aforementioned phase shift $\phi$ is introduced into the third reference beam, and further comprising splitting a united beam comprising the combined beam and the beam reflected from the front surface of the film into a first polarized beam and a second orthogonally polarized beam and creating a first interferogram using the first polarized beam and a second interferogram using the second orthogonally polarized beam.

Furthermore, in accordance with a preferred embodiment of the present invention, the phase shift is obtained by the use of a doubly refracting phase plate, for which the phase shifts are different in the two principle polarizations, having values $\phi_1$ and $\phi_2$, chosen so that at least one of the interferograms is bound to be sensitive enough to measure the thickness of the film with improved accuracy, compared to the accuracy obtainable by means of interference between the beams reflected from the front and back surfaces of the sample alone, the choice of the aforesaid phase shifts being made in accordance with the refractive indices of the film and the substrate.

Furthermore, in accordance with a preferred embodiment of the present invention, there is provided an apparatus for measuring a given area of thin film, the apparatus comprising:

a substrate on which the film is laid;

a light source for irradiating the film with an incident coherent or partially coherent beam so as to get two reflected beams in the form of a combined beam, the first reflected beam being reflected from the front surface, and the second beam being reflected from the back surface;

a third reference beam facilitator for facilitating a third reference beam originating from the incident beam, and substantially parallel to the two reflected beams, wherein the third reference beam acquires a phase shift;

at least one imaging means for obtaining an interferometric image of a united beam comprising the two reflected beams and the third reference beam.

Furthermore, in accordance with a preferred embodiment of the present invention, the imaging means comprises a CCD camera.

Furthermore, in accordance with a preferred embodiment of the present invention, a reference mirror is provided, off which the third reflected beam is reflected.

Furthermore, in accordance with a preferred embodiment of the present invention, the apparatus further comprising a beam splitter for splitting a united beam comprising the combined beam and the beam reflected from the front surface of the film into a first polarized beam and a second orthogonally polarized beam, a phase shift means are provided to achieve the aforementioned phase shifts $\phi_1$ and $\phi_2$ in the first polarized beam and the second orthogonally polarized beam respectively, and two imaging means, used for obtaining a first interferogram using the first polarized beam and a second interferogram using the second orthogonally polarized beam, whereby at least one of the interferograms is bound to be sensitive enough to measure the thickness of the film with improved accuracy, compared to the accuracy obtainable by means of interference between the beams reflected from the front and back surfaces of the sample alone, the choice of the aforesaid phase shifts being made in accordance with the refractive indices of the film and the substrate.

Furthermore, in accordance with a preferred embodiment of the present invention, the phase shift means comprises a birefringent wave-plate.

Furthermore, in accordance with a preferred embodiment of the present invention, the birefringent wave-plate has optical thicknesses $\lambda\phi_1/2\pi$ and $\lambda\phi_2/2\pi$ in its two principal polarizations such that the resulting reference beams have phases differing by $\pi/2$ and are chosen so that at least one of the interferograms is bound to be sensitive enough to measure the thickness of the film with improved accuracy, the choice being made in accordance with the refractive indices of the film and the substrate.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

FIG. 4a is a plot illustrating the change in intensity, in gray levels for an 8-bit camera, corresponding to 10 Å water film thickness as a function of the thickness $d_{subs}$ (solid line). The dashed line corresponds to the equivalent result that would have been obtained in the two-beam configuration.

FIG. 4b is a plot showing intensity of light reflected from a bare substrate in the three-beam configuration (of FIG. 1b) relative to intensity of light reflected from a single interface, as a function of substrate thickness.

FIG. 6a is a three-beam interference image showing an example of developing fronts between thick and thin water films on mica.

FIG. 6b is a plot of the profile of the interface between a thin film and a thick film, measured by three-beam interferometry in accordance with the present invention. The higher rim is a result of a hydrodynamic phenomenon, which appears because of flow that occurs when the edge is moving.

DETAILED DESCRIPTION OF PREFERRED EMBODIMENTS

Interferometric techniques play an important role in the measurement of thin transparent films on substrates. The simplest interferometric method of measuring the thickness $h_{film}$,(x,y) of a non-uniform thin film involves creating an image by superposition of beams reflected from two interfaces: air/film and film/substrate.

Figure 1A:
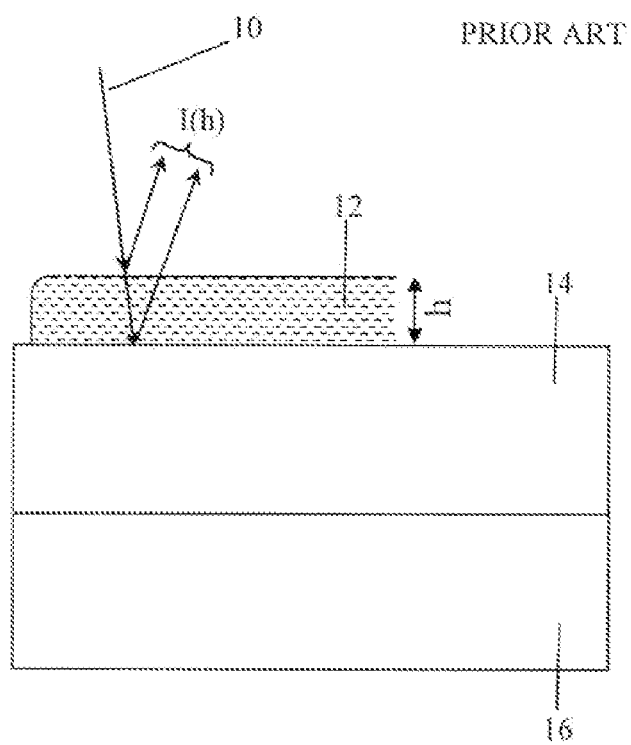
FIG. 1a illustrates conventional two-beam interferometry for measuring the thickness of a thin film over a mica surface.

FIG. 1a illustrates two-beam interferometry for measuring the thickness of a thin water film 12 over a mica substrate 14. Incident light beam 10, which is either coherent or partially coherent with coherence length that is at least equal to the maximum thickness of the film (hereinafter—partially coherent), is directed onto thin film 12, and is partially reflected and partially refracted through. The refracted portion of the beam traverses through the thin film and then reflected by the water-mica interface. Absorbing grease 16 laid beneath mica substrate 14 is provided to inhibit reflections off the back surface of the mica substrate 14.

This method is most sensitive when $h_{film}\approx(2m+1)\lambda/(8n_{film})$, where $\lambda$ is the incident light wavelength in vacuum, m is an integer, at which the dependence of reflected intensity on thickness is linear and the contrast is maximized when the reflection coefficients at the interfaces are approximately equal.

On the other hand, it is not sensitive for very thin films $h_{film}<<\lambda/(8n_{film})$ because in this case there is an approximately quadratic dependence of reflected intensity on film thickness. Such films are commonly measured using ellipsometry.

However, if the thin film is deposited on a transparent substrate, the light reflected from the bottom of the substrate has to be eliminated. Otherwise, there are great problems involved in using ellipsometry, since the bottom reflection contributes a background p-polarized wave which obscures the weak p-polarization from the film on which ellipsometry is based.

In view of the above problem, a three-beam imaging interferometric technique is disclosed herein, which takes advantage of the reflections at the air-film interface and both substrate surfaces.

Figure 1B:
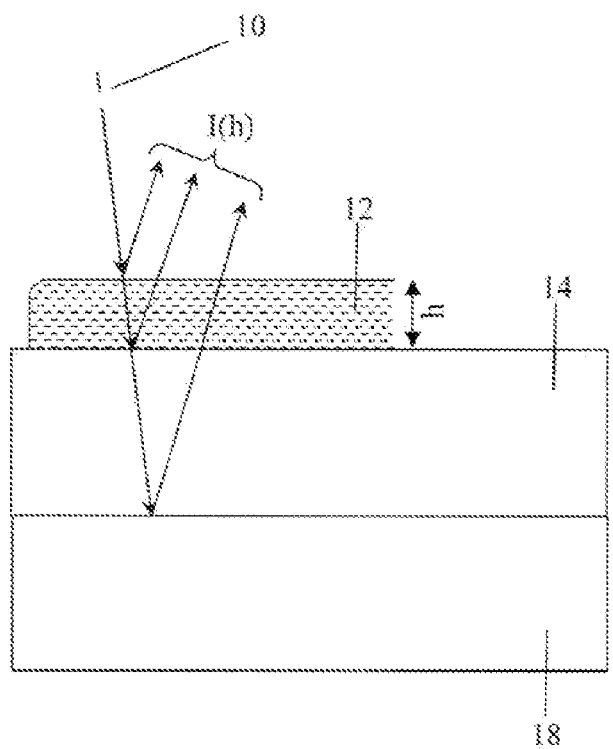
FIG. 1b illustrates three-beam interferometry in accordance with a preferred embodiment of the present invention for measuring the thickness of a thin film over a mica surface.

FIG. 1b illustrates three-beam interferometry in accordance with a preferred embodiment of the present invention for measuring the thickness of a thin film over a mica surface. Here beneath mica substrate 14 there is provided vacuum 18 (or in fact any medium that will ensure reflection from the back surface of the mica substrate). This enables tuning the sensitive (linear) region to any desired film thickness, including very thin films in particular. The substrate thickness at a certain angle of incidence is chosen so that the superposition of the reflected waves from the two surfaces is substantially in quadrature with the wave reflected from the upper film surface. This means that the total reflected light intensity varies linearly with $h_{film}$ over a certain range of thickness. The method can be applied to high-resolution interference imaging, since the required superposition can be achieved approximately for a fairly wide range of incidence angles about zero if the substrate thickness takes the smallest possible value satisfying the quadrature condition. However, since the range is necessarily limited, it will inevitably lead to some trade off between x-y resolution and z resolution.

The method of the present invention has been developed initially for investigation of pattern formation in evaporating water films on mica surfaces. The goal of the research was to confirm the coexistence of a thin (<30 Å) water film with a much thicker one during the evaporation process and to measure the thickness of the two films. The coexistence of two films was described formerly by de Gennes (P. G. de Gennes, Rev. Mod. Phys. 57, 325, (1985)), but was never measured due to difficulty of imaging a very thin film on a transparent substrate.

The calculated intensity for interference between plane-parallel waves reflected from three interfaces, including multiple reflections, is given by the following polarization dependent expression:

$$I_1(\delta_1, \delta_2) = I_0 \sum_{p,s} \left| \frac{(r_{12}^{p,s} e^{i\delta_1} + r_{23}^{p,s}) e^{i\delta_2} + (r_{12}^{p,s} r_{23}^{p,s} e^{i\delta_1} + 1) r_{31}^{p,s}}{(e^{i\delta_1} + r_{12}^{p,s} r_{23}^{p,s}) e^{i\delta_2} + (r_{23}^{p,s} e^{i\delta_1} + r_{12}^{p,s}) r_{31}^{p,s}} \right|^2 \quad [1]$$

Where $r_{ij}^p = (n_i \cos(\theta_j) - n_j \cos(\theta_i))/(n_i \cos(\theta_j) + n_j \cos(\theta_i))$, $r_{ij}^s = (n_i \cos(\theta_i) - n_j \cos(\theta_j))/(n_i \cos(\theta_i) + n_j \cos(\theta_j))$ are the signed reflectivities of interfaces between i and j, subscripts i,j=(1,2,3) of n correspond to indices of refraction of air, film and the substrate respectively, and $\theta_i$ is the angle of propagation in the medium. It is assumed the same illumination intensity for both polarizations. The phase differences $\delta_1$ and $\delta_2$ are functions of film thickness, $h_{film}$, and substrate thickness, $d_{subs}$;

$\delta_1 = 4\pi\, n_2 h_{film} \cos(\theta_2)/\lambda$ $\delta_2 = 4\pi\, n_3 d_{subs} \cos(\theta_3)/\lambda,$ [2]

In the application developed here $\theta_{1,2,3} \approx 0$, but for higher-resolution imaging, non-zero values will have to be taken into account (see below).

In order to make the expression for the reflected intensity more intuitive, it may be approximated with accuracy of 95% for practical values of n by a simpler form:

$$I_1(\delta_1, \delta_2) = I_0 \sum_{p,s} |(r_{12}^{p,s} + r_{23}^{p,s} e^{-i\delta_1}) + r_{31}^{p,s} e^{-i(\delta_1 + \delta_2)}|^2 \quad [3]$$

This can be compared to the intensity expression for two beam interferometry calculated by eliminating the bottom substrate reflection and using the same approximation:

$$I_2(\delta_1) = I_0 \sum_{p,s} |r_{12}^{p,s} + r_{23}^{p,s} e^{-i\delta_1}|^2 \quad [4]$$

Figure 2:
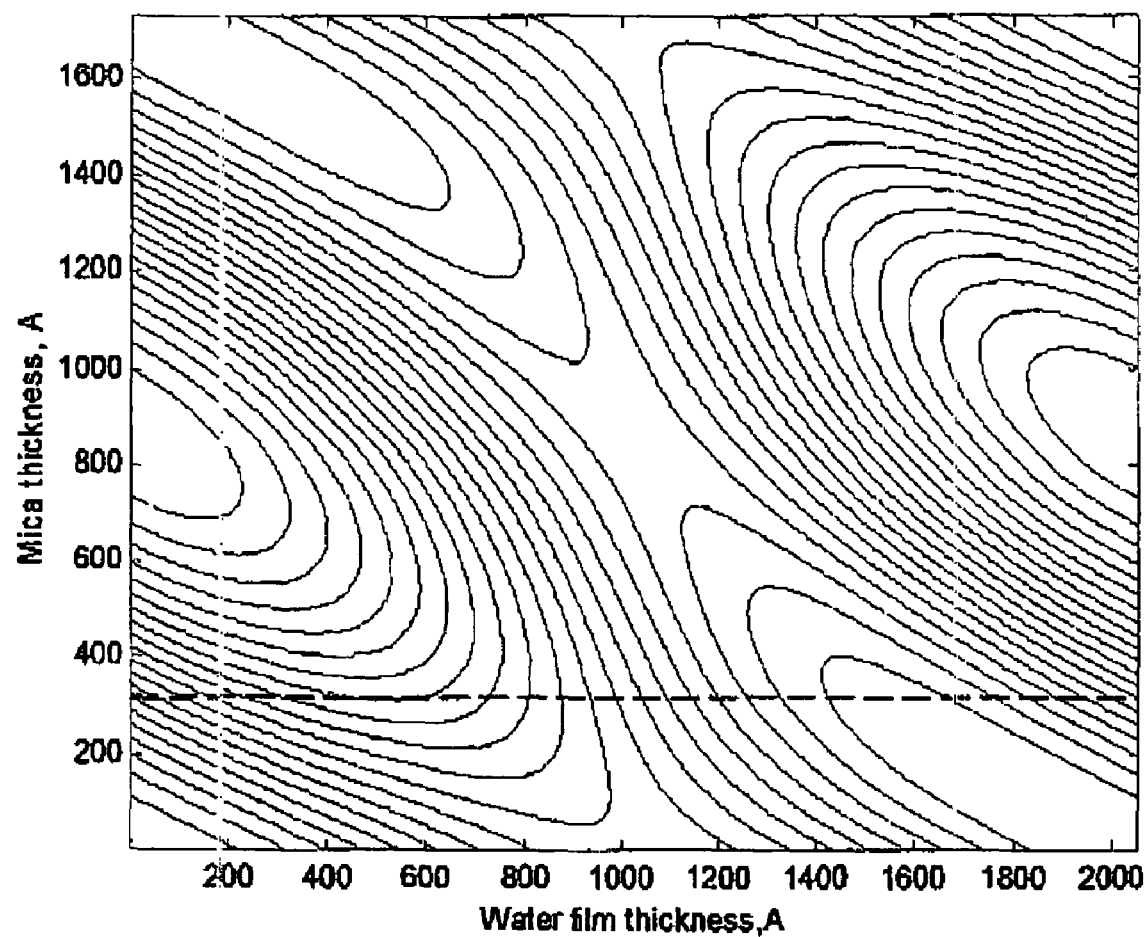
FIG. 2 is a periodic contour plot of light intensity as a function of the substrate thickness $d_{subs}$ and the thickness of the thin $h_{film}$ for a water film ($n_2$=1.33) on a mica substrate, using the average in-plane refractive index for mica ($n_3$=1.58) and $\lambda$=540 nm. The contours are equally spaced between zero at the four corners of the diagram and maximum value at (0, 850 Å). The values along the broken line for $d_{subs}$=320 Å are shown in FIG. 3 (broken line in FIG. 3).

In FIG. 2 a periodic part of a diagram of intensity is shown as a function of $d_{subs}$ and $h_{film}$ for the example $n_{film}=1.33$, $n_{subs}=1.58$ and $\lambda=540$ nm from which the sensitivity for various film thicknesses may be deduced. For a particular substrate thickness, $d_{subs}$, the intensity dependence on film thickness $h_{film}$ corresponds to the values along the appropriate horizontal line.

In general, one looks for the substrate thickness $d_{subs}$ for which the variation of $I_1$ is fastest around the expected value of $h_{film}$ (which is close to zero), i.e. $d^2 I_1(\delta_1, \delta_2)/d\delta_1^2 = 0$. The optimum substrate thickness for $h_{film} \to 0$ occurs when $\cos \delta_2 = -r_{23}/r_-$ which has the first solution at optimum substrate thickness $$d_{subs}^{(0)} = 320 \text{ Å}$$

Figure 3:
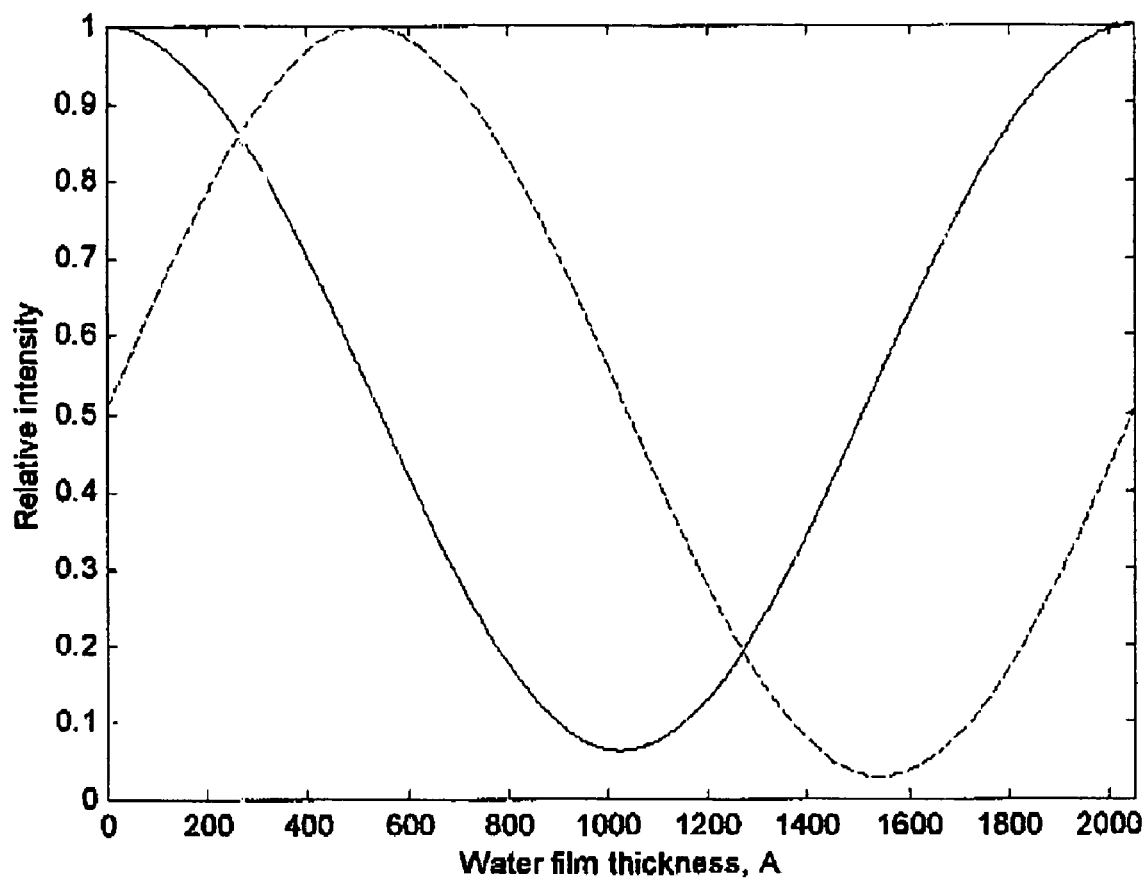
FIG. 3 is a plot comparing reflected light intensities as a function of water film thickness on mica surface for two- and three-beam configurations (solid and broken lines, respectively), for an optimal substrate thickness.

(dashed line in FIG. 2). It is important to note that the same high sensitivity is also obtained for other solutions $$d_{subs}^{(m)} = (-1)^m d_{subs}^{(0)} + m\lambda/(2n_3),$$

where m is a positive integer. As an example, FIG. 3 illustrates graphs of $I_1$ for $d_{subs} = 320$ Å and $I_2$ as a function of film thickness.

In order to relate to experimental conditions it is assumed that the intensity signal is recorded digitally as a gray level between 0 and 255. The graph in FIG. 4a shows the change in the gray level corresponding to a 10 Å film thickness as a function of the thickness $d_{subs}$ (for a standard wavelength). These values are favorably compared to 0.04 gray level obtained with two-beam interferometry when the bottom substrate reflection is eliminated, which is also shown in the diagram. By suitable choice of substrate thickness, the method can be used to determine film thickness down to 5 Å, which corresponds to 1 gray level with a 8-bit camera, but this could be improved by using a camera with more bits.

To make quantitative measurements, it is necessary to have a calibration method to find the optical thickness of the substrate and the sensitivity of the technique. There are several ways of doing this. In the described experiments the first of these methods was used:

1) Eliminate the back reflection in one part of the substrate in the field of view. Comparison between the reflected light intensities for $h_{film} = 0$ from both regions, which are $I_1(\delta_1 = 0, \delta_2)$ and $I_2(\delta_1 = 0)$, allows the substrate thickness $d_{subs}$ be calculated. FIG. 4b shows the dependence of reflected light intensity from a bare substrate in the three-beam configuration relative to intensity of light reflected from a single interface as a function of substrate thickness. This approach is suitable for investigation of adsorption of very thin film adsorption on an initially clean substrate.

2) Change the angle of incidence or wavelength in order to change $\delta_2$ in a controlled manner.

The technique described above has been used for the study of pattern formation in drying water film on mica surface.

The experiments were carried out at 0° C. in a high vacuum evacuated system, into which water vapor could be introduced by evaporation from a separate chamber containing distilled water. The temperature, T, of the copper-made experimental cell, was controlled by an arrangement of thermoelectric coolers. The mica sample under investigation was attached by a thin layer of high-vacuum absorbing black wax to a copper in-cell pedestal. The pedestal was in a ring form, which enabled simultaneous observation of three beam and two beam (in the glued region of the sample) interferometry. The sample and pedestal temperature, $T_s$, was controlled independently by an additional thermoelectric cooler. If $T_s<T$, water vapor condenses from the cell walls to sample surface and vice versa.

The pattern created during evaporation was observed by a 10-magnification reflective microscope with NA=0.1. Illumination by a Hg lamp with a filter to isolate the 540 nm line gave a coherence length of about 1 mm, enough to produce a combined interferometric image from all interfaces when $d_{subs}$=0.2 mm. However, in order to keep high sensitivity to film thickness (FIG. 7) the substrate thickness was usually in the range 10–20 μm.

Figure 5:
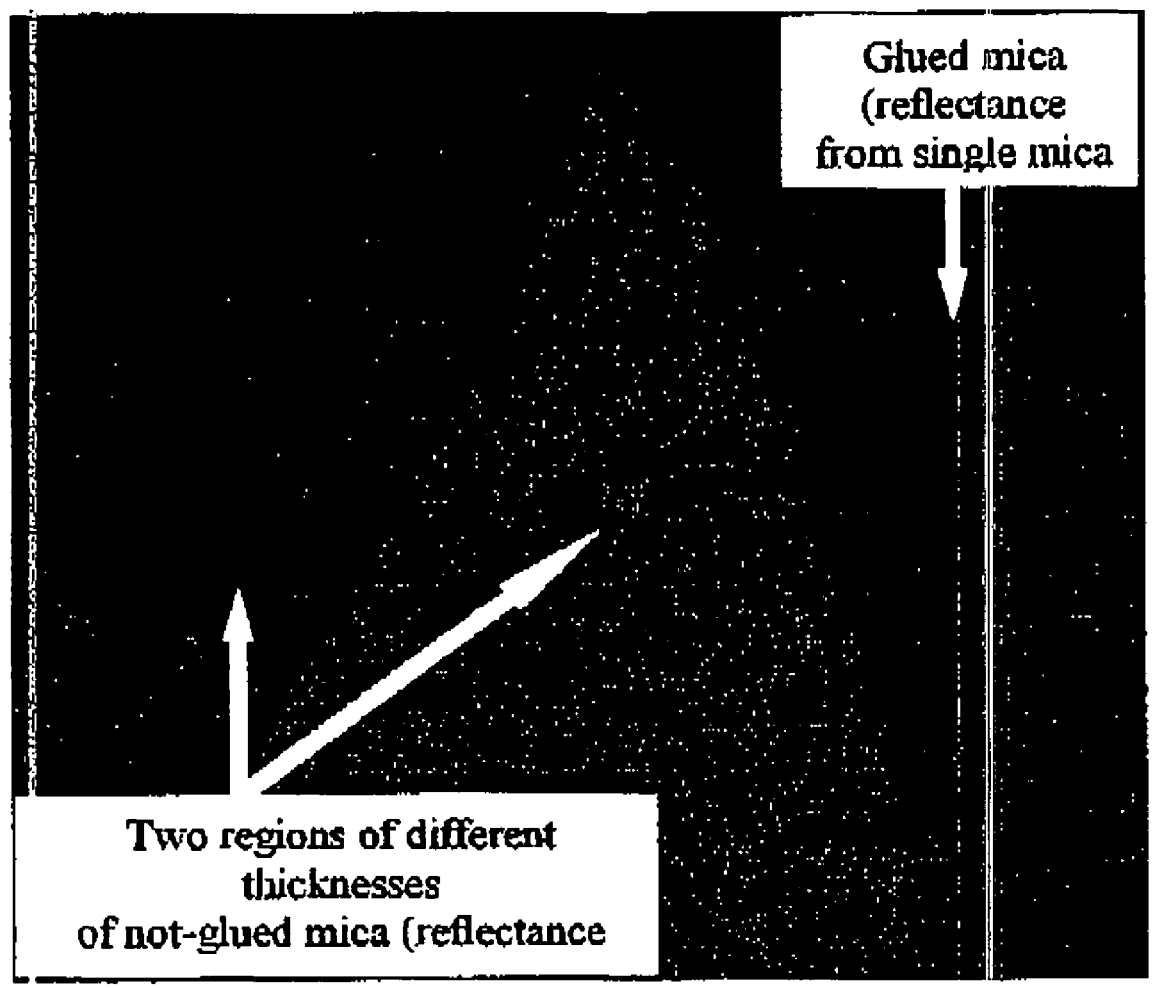
FIG. 5 is an experimental observation of regions of different thicknesses of free-standing mica (reflectance from both mica surfaces) together with region of glued mica (reflectance from a single mica surface). The figure depicts different gray-levels for the regions in the case of a bare substrate.

Sensitivity of the method and effective optical thickness of bare mica was found by comparison between intensities reflected from a bare substrate in the three-beam configuration relative to intensity of light reflected from a single interface (FIG. 5). By repeated cleaving of the mica surface a useful sensitivity of 5 Å per gray scale for very thin films was achieved.

FIG. 6b shows the first measurements of the thickness of the two continuous films predicted by the theoretical model of the present invention. The two films are separated by a higher rim, which develops due to hydrodynamic flow, and has been seen previously in both experiments and simulations.

It can be seen that for the case investigated the two films are 25±5 Å and 110±10 Å thick. It should be pointed out that these measurements are relative to "clean mica" under the lowest vapor pressure attainable in the system, which would still be covered by a monolayer of water.

The above experiment demonstrates the application of the three-beam interferometric imaging to the measurement of an inhomogeneous thin film on a transparent substrate. Because the sensitivity of the method depends critically on the phase difference $\delta_2$ introduced by the substrate, and this is a function of the angle of incidence, there must be some trade-off between spatial resolution and thickness resolution as a function of the numerical aperture (NA) of the imaging system. In order to get high spatial resolution, a high NA is necessary, and this introduces a spread in $\delta_2$, so that non-optimum values will be involved.

Figure 7:
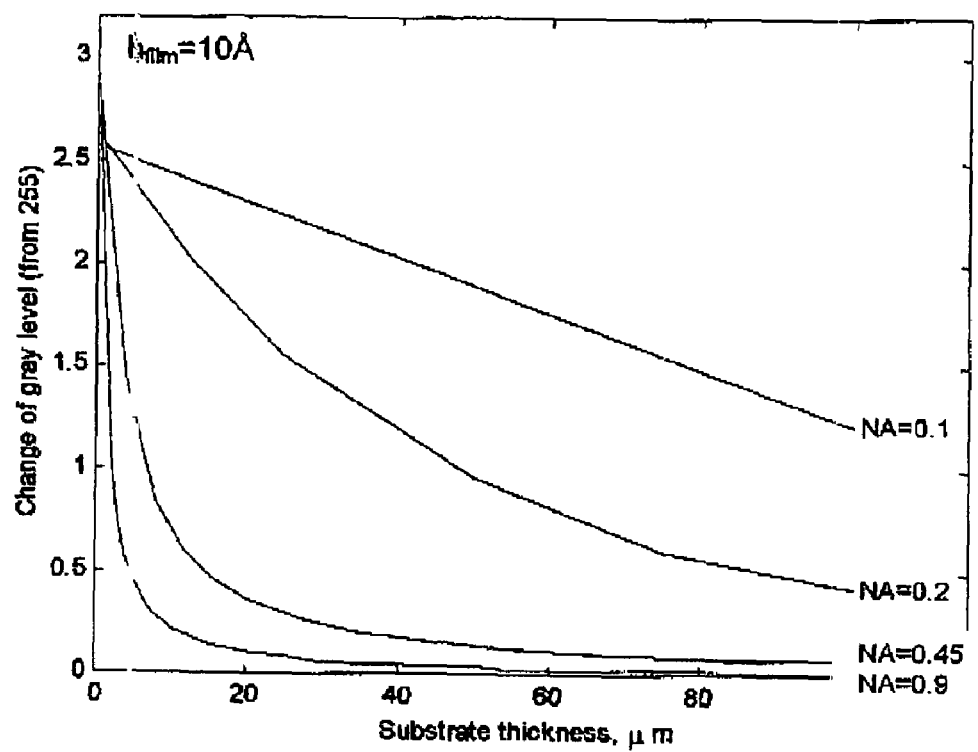
FIG. 7 illustrates the effect of the numerical aperture (NA) on the sensitivity of a thin film for a thickness of 10 Å water on mica, as a function of the substrate thickness (assuming the mica to have been cleaved optimally at each stage).

The effect of the NA on the thin film sensitivity was calculated for a thickness of 10 Å water on mica, as a function of the substrate thickness by superposition of the intensities through the range of incidence angles up to the NA (FIG. 7).

For any particular water film thickness, there are periodic optimum mica thicknesses, and the curves show the envelope of the optimum values (FIG. 7). It is clear that the best sensitivity for highest NA and spatial resolution is obtained using the thinnest substrate possible, consistent with FIG. 2a; this is particularly important for high NA imaging. The method of the present invention can be further appreciated by comparing it with ellipsometry. In ellipsometry, the angle of incidence of the investigating light has to be close to the Brewster angle on the substrate in order to obtain sensitivity to the film thickness. On Si (silica) this means 75.6±0.05°. The numerical aperture is thus NA=0.1°/57.3°=1.6·10$^{-3}$. The spatial resolution limit is $\lambda/2NA=3\cdot 10^3\cdot\lambda$ in the dimension in the plane of incidence. In the case of three beam interference a spatial resolution limit of 10λ can be obtained. In both cases this parameter may be improved synthetically by image processing as it is done in commercial ellipsometers, but the advantage of the present approach is obvious. In order to achieve high sensitivity and spatial resolution together, it is possible to use high numerical aperture together with conical illumination at the edge of the cone of incidence, since $\delta_2$ can be well defined in this configuration. $\delta_2$ is then tuned to the optimum value by varying the angle of the incidence cone.

The present invention is hereby discussed with respect to application to an opaque substrate. In this case, the additional reflection, which was provided by the back of the substrate, could be from the reference mirror in a Linnik interferometer (FIG. 9), whose reflectivity should be chosen to be close to that of the film substrate interface. The "thickness of the substrate" could then be tuned by making small corrections to the position of the reference mirror to achieve the optimum value. The theory for this case is as follows.

Similarly to eq. 2., the calculated intensity for interference between plane-parallel waves reflected from two interfaces of film and the reference beam, approximated with accuracy of 95% for practical values of n is given by the following expression, in which values of the measured intensity is polarization dependent as indicated by $I^p$ and $I^s$ in the two principal polarization directions:

$$I_3^{p,s}(\delta_1,\phi,r)=I_0|(r_{12}^{p,s}e^{i\delta_1}+r_{23}^{p,s}e^{-\delta_1 n_2})+r^{p,s}e^{i\phi}|^2 \quad [3]$$

Where r is an amplitude reflectivity of the reference mirror, $\phi$ is the phase shift of the reference beam.

In general, one looks for the phase shift $\phi$ and reflectivity r, for which the variation of $I_3$ is fastest around the expected value of $h_{film}$, i.e. $d^2I_3(\delta_1, r,\phi)/d\delta_1^2=0$.

The optimum phase shift $\phi_1$ for $h_{film} \to 0$ occurs when cos $\phi_1=r_{12}r_{23}(n_2+n_1)^2/r(r_{12}+r_{23}n_2^2)$, and $\phi_2$ is larger or smaller than $\phi_1$ by $\pi/2$.

Figure 8:
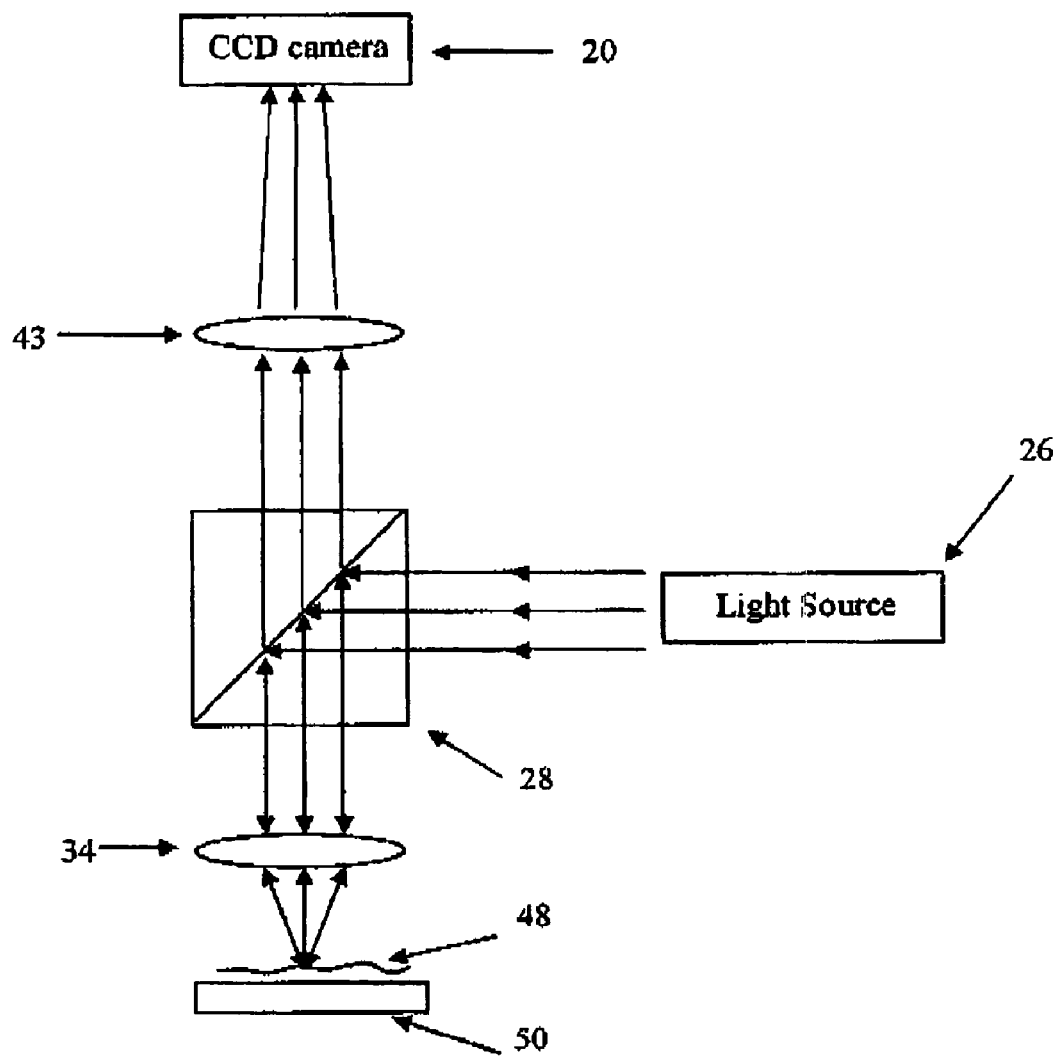
FIG. 8 illustrates an optical setup for measuring thin films on transparent substrates, in accordance with a preferred embodiment of the present invention.

FIG. 8 illustrates an optical setup for measuring thin films on transparent substrates, in accordance with a preferred embodiment of the present invention. This configuration was developed to enable a measurement of a thin film 48 on transparent substrate 50. An interference pattern created on CCD-camera 20 is a sum of the beams reflected from three interfaces: air/film, film/substrate-(upper substrate plane), substrate/air(vacuum)-(lower substrate plane). The change of phase of the beam reflected from substrate/air interface allows the invention to be operated under conditions where the intensity-film thickness function has a desired region. It is done by changing the substrate thickness or by varying the illuminating light wavelength. Light source 26 generates a coherent or partially coherent beam that is directed at non-polarizing beam splitter 28, from which a beam is directed through objective lens 34 onto sample 48 laid on transparent substrate 50 (see also FIG. 1b). The reflected beams (three beams) are directed through objective lens 34 and non-polarizing beam splitter 28 through imaging lens 43 to CCD camera 20.

Figure 9:
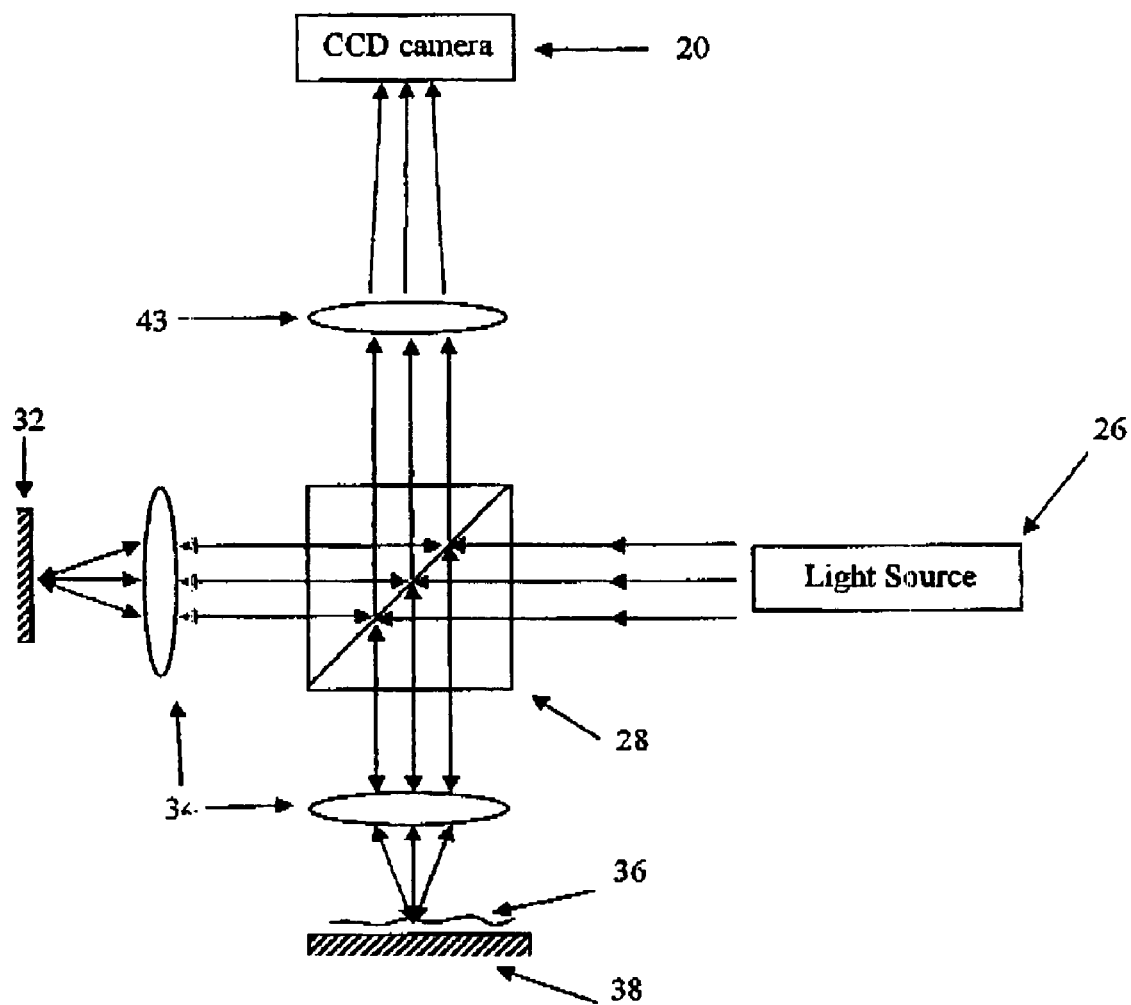
FIG. 9 illustrates an optical setup for measuring thin films on opaque substrates, in accordance with another preferred embodiment of the present invention.

FIG. 9 illustrates an optical setup for measuring broadband thickness films on opaque substrates, in accordance with another preferred embodiment of the present invention. An interference pattern created on a CCD-camera 40 is a sum of the beams reflected from three interfaces: air/film, film/opaque substrate, reference beam reflected from an additional mirror. The change of phase of the latter beam (reflected from the mirror) the intensity-film thickness function to a desired region. It may be realized by moving the additional mirror to desired position or by varying the illumination wavelength. This concept is similar to the well-known Linnik-interferometer. The idea is to choose the phase difference between the two arms of the interferometer in order to be at maximal sensitivity to changes in the thin film thickness.

The third apparatus enables a measurement of thin films on opaque substrates. The former methods are sensitive to thickness of very thin films. However they lose accuracy as the film thickness $h=\lambda/8n_{film}$ is approached, since the parabolic (non-sensitive) region of the intensity-film thickness curve is achieved. However film thicknesses around this region are easily measured by regular two-beam interferometer (as described in 2, but after a reference beam was removed). In this concept a way to overcome this problem and to avoid any insensitive regions from thin film thickness measurements is shown.

Description of the idea: 1) Non-polarized light beam after it falls on a non-polarizing beam-splitter is divided into two beams. One goes towards the sample and reflected back to the beam-splitter. The second one goes towards a reference mirror. In this path the second beam passes through a birefringent wave plate, which introduces after two passes a phase shift of $\phi_1$ in one principal polarization and $\phi_2$ in the other principal polarization. This phase shift difference is necessary in order to observe very thin films using $\phi_1$ and thicker films using $\phi_2$. These two beams will exit from two separate sides of the following second Beam-Splitter which is polarizing. Two interferograms with the beam reflected from the sample are simultaneously created on two separate CCD-cameras. It guarantees, that one is always sensitive to very thin film and another to $h \approx \lambda/8n_{film}$ and their cyclic values.

Figure 10:
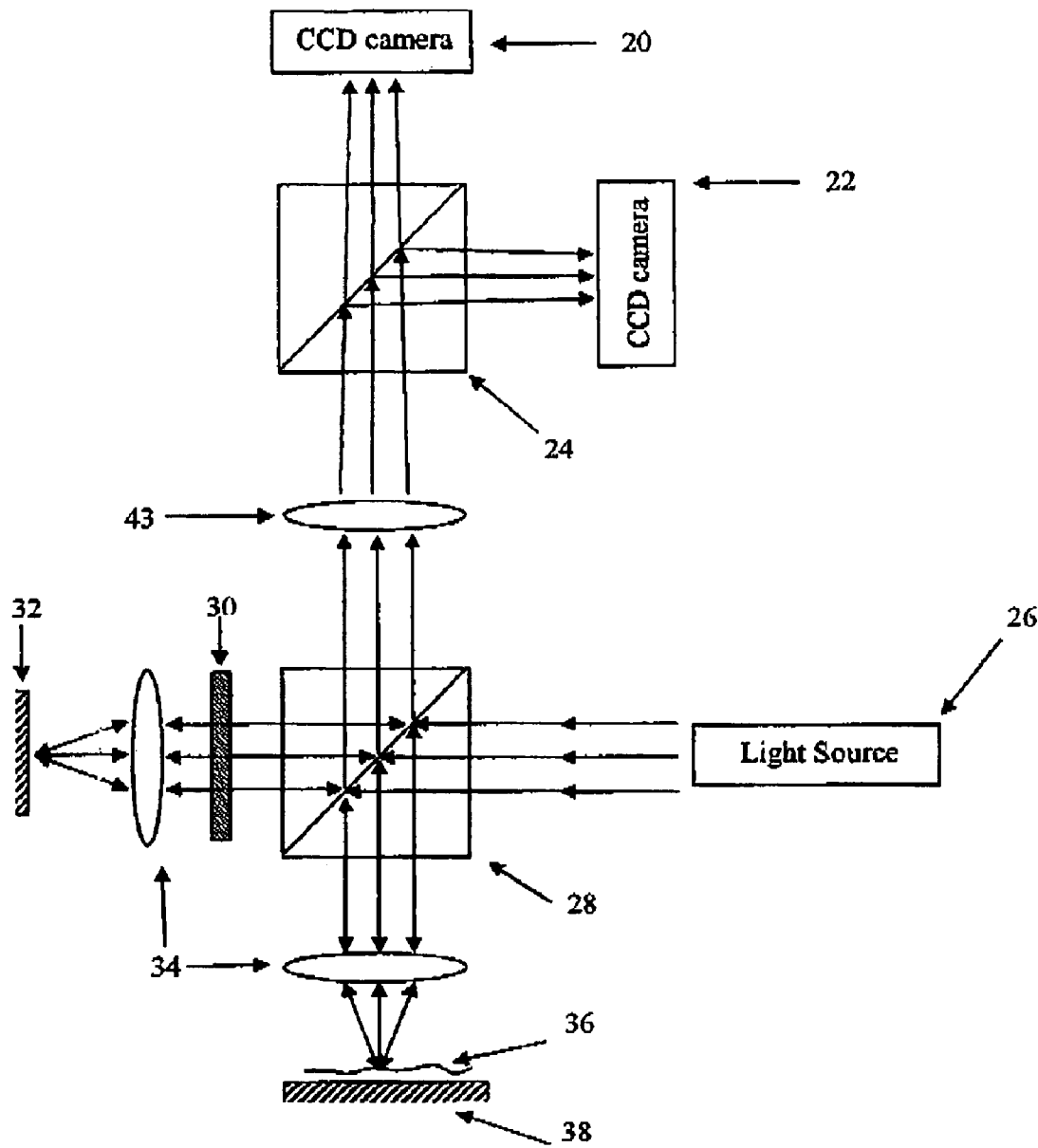
FIG. 10 illustrates an optical setup for measuring broadband thickness films on opaque substrates, in accordance with a preferred embodiment of the present invention.

FIG. 10 illustrates an optical setup for measuring broadband thickness films on opaque substrates, in accordance with a preferred embodiment of the present invention. Although the method of three-beam interferometry, as described above, allows high sensitivity to be achieved around a certain chosen regions of $h_{film}$, this is at the expense of poor sensitivity in the other regions of interleaving thicknesses. The following adaptation would allow high sensitivity to be achieved at all thicknesses, and would therefore be applicable to films with thickness varying by more than $\lambda/8$ over the field of view. Two cameras are used: one camera 20 viewing on image in s-polarized light, and the second camera 22 viewing in p-polarized light. In the reference beam channel, the birefringent wave plate 30 is inserted (the orientation of its axes defines the s- and p-axes). Light source 26 generates a coherent or partially coherent beam, that is split by a non-polarizing beam splitter 28 into two beams—one beam is directed at birefringent wave plate 30 and through objective 34 is reflected from reference mirror 32 back (through the objective and birefringent wave plate 30) to non-polarizing beam splitter 28. The other beam is directed through objective 34 at the sample 36 which is laid on opaque (reflective) substrate 38, and is reflected back through objective 34 to non-polarizing beam splitter 28. Both reflected beams are then directed towards polarizing beam splitter 24, so that indeed the s-polarized light is viewed by camera 20 and the p-polarized light is viewed by camera 22.

The present invention is not limited to visible light only, and in fact the method described herein can be implemented for electromagnetic radiation of other wavelengths too, for example UV, IR (but not limited to these examples).

Although in the present specification reference was made to a water film, mica substrate, it is given only for the sake of explaining the merit of the present invention, and in fact the present invention is implementable for any type of transparent thin film, and for any kind of transparent substrate (where applicable).

The present invention is not limited to the examination of a single layer on a substrate, and in fact the method described herein can be implemented for examining multilayer structures too. Illumination and imaging is not restricted to a single wavelength and may be implemented for simultaneous imaging on number of cameras or a single CCD color camera.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the scope of the present invention.

The invention claimed is:

1. A method for determining the topography of a thin film having a front surface and a back surface, the method comprising:
   irradiating the film with an incident coherent or partially coherent light beam so as to get two reflected beams, the first reflected beam being reflected from the front surface of the film, and the second beam being reflected from the back surface of the film; and
   creating an interferometric image from a united beam comprising the two reflected beams and a reference beam, the reference beam originating from the incident beam, and made to be substantially parallel to the two reflected beams, wherein the reference beam acquires a phase shift,
   whereby the interferometric image is created by the interference between a combined beam comprising the reference beam and the second reflected beam, and the first reflected beam, thus acquiring information on the topography of the film that cannot be acquired using the two reflected beams alone.

2. The method of claim 1, wherein the incident beam is partially coherent with coherence length that is at least equal to the maximum thickness of the film.

3. The method of claim 1, wherein at least two interferometric images are obtained, from which information on the topography of the film is extracted.

4. The method of claim 3, wherein at least two cameras are used in the acquiring of said at least two interferometric images.

5. The method of claim 1, wherein the reference beam is reflected off a surface of a substrate below the film.

6. The method of claim 5, wherein the optical thickness of the substrate at a predetermined angle of incidence is chosen so that the phase of the combined beam is substantially in quadrature with the phase of the beam reflected from the front surface of the film.

7. The method of claim 1, wherein the reference beam is reflected off a mirror.

8. The method of claim 7, wherein the phase of the reference beam is chosen to have a value such that the intensity of the resultant of the two reflected and the reflected reference beam is substantially sensitive to changes in the thickness of the sample.

9. The method of claim 8 wherein the phase shift is acquired using a phase shift wave-plate.

10. The method of claim 8, wherein a phase shift is introduced to the reference beam, and further comprising splitting a united beam comprising the combined beam and the beam reflected from the front surface of the film into a first polarized beam and a second orthogonally polarized beam and creating a first interferogram using the first polarized beam and a second interferogram using the second orthogonally polarized beam, whereby at least one of the interferograms exhibits linear dependence between the intensity of the reflected beams and the thickness of the film.

11. The method of claim 10, wherein the phase shifts in the two orthogonal polarizations of the reference beam are different.

12. The method of claim 10, wherein the phase shifts in the two orthogonally polarizations are obtained by the use of a birefringent device.

13. An apparatus for measuring a given area of thin film, the apparatus comprising:
   a substrate on which the film is laid; a light source for irradiating the film with an incident coherent or partially coherent beam so as to get two reflected beams, the first reflected beam being reflected from the front surface of the film, and the second beam being reflected from the back surface of the film;
   a reference beam facilitator for facilitating a reference beam originating from the incident beam, and made to be substantially parallel to the two reflected beams, wherein the reference beam acquires a phase shift; and
   at least one imaging means for obtaining an interferometric image of a united beam comprising the two reflected beams and the reference beam.

14. The apparatus of claim 13, wherein the imaging means comprises a CCD camera.

15. The apparatus of claim 13, wherein the reference beam is provided by reflection from the bottom of a transparent substrate, the optical thickness of the substrate at a predetermined angle of incidence being chosen so that the phase of a combined beam comprising the reference beam and the second reflected beam is substantially in quadrature with the phase of the beam reflected from the front surface of the film.

16. The apparatus of claim 13, wherein a reference mirror is provided, off which the reference beam is reflected.

17. The apparatus of claim 16, wherein a phase shift is introduced to the reference beam, the apparatus comprising a beamsplitter for splitting a united beam comprising the combined beam and the beam reflected from the front surface of the film into a first polarized beam and a second orthogonally polarized beam, and two imaging means used for creating a first interferogram using the first polarized beam and a second interferogram using the second orthogonally polarized beam, whereby at least one of the interferograms exhibits linear dependence between the intensity of the reflected beams and the thickness of the film.

18. The apparatus of claim 17, wherein the phase shift means comprises a birefringent device.

19. The apparatus of claim 18, wherein the birefringent device provides reference beams differing in phase by substantially $\pi/2$.

* * * * *